United States Patent [19]

Seko et al.

[11] 3,953,569

[45] *Apr. 27, 1976

[54] CONCENTRATION OF URANIUM 235 IN MIXTURES WITH URANIUM 238 USING ION EXCHANGE RESINS

[76] Inventors: Maomi Seko, 6-5, 2-chome, Ookayama, Meguro, Tokyo; Hidetake Kakihana, 2-24, 3-chome, Zaimokuza, Kamakura, Kanagawa, both of Japan

[ * ] Notice: The portion of the term of this patent subsequent to Apr. 27, 1993, has been disclaimed.

[22] Filed: July 17, 1972

[21] Appl. No.: 272,251

[30] Foreign Application Priority Data

July 22, 1971 Japan.............................. 46-54210
Sept. 28, 1971 Japan.............................. 46-75072
June 12, 1972 Japan.............................. 47-57636
June 13, 1972 Japan.............................. 47-58221

[52] U.S. Cl............................. 423/7; 252/301.1 R; 423/351; 423/414
[51] Int. Cl.²......................................... B01D 59/30
[58] Field of Search.............. 423/2, 6, 7, 139, 181, 423/298, 351, 414; 252/301.1 R

[56] References Cited
UNITED STATES PATENTS 3,511,620   5/1970   Shimokawa et al................... 23/338
3,522,172   7/1970   Pretorius et al.................... 210/31 C

OTHER PUBLICATIONS

Hackh's Chemical Dictionary, Fourth Ed. 1969, p. 156.

Kakihana, "Ion–Exchange Separation of Lithium, Nitrogen & Uranium Isotopes", J. de Chimie Phys., Vol. 60, pp. 81–88, 1963.

Spedding, "Macro Separation of Stable Isotopes on Ion-Exchange Columns," J. de Chimie Phys., Vol. 60, pp. 89–96, 1963.

Kakihana et al., "Ion–Exchange Separation of Isotopes", Nuc. Sci. Abst., Vol. 17, No. 4, Abst. No. 23839, 1963.

Perret et al., "Processes Involving the Isotopes of Lithium", Proc. – 2nd Conf. on Peaceful Uses of Atomic Energy, Vol. 4, pp. 598–599, 1958.

*Primary Examiner*—Leland A. Sebastian
*Assistant Examiner*—R. E. Schafer
*Attorney, Agent, or Firm*—Burgess, Dinklage & Sprung

[57] ABSTRACT

A method of simultaneously obtaining separate enriched fractions of $^{235}U$ and $^{238}U$ from isotopic mixtures thereof with the use of an ion exchange column by passing a liquid body containing the isotopic mixture through the column. The uranium as it is passed through the column is present as a U(IV) coordination compound with a ligand at different valent states and is followed by an eluant and forms a band which travels through the column, the front and rear portions of which are respectively enriched in one of the isotopes and depleted in the other.

16 Claims, No Drawings

CONCENTRATION OF URANIUM 235 IN MIXTURES WITH URANIUM 238 USING ION EXCHANGE RESINS

This invention relates to the efficient concentration of uranium 235 using an ion exchange resin.

It is known from the literature that some isotopes of small mass have been separated by using an ion exchange resin. The principles of such separation are based on a different affinity of the ion exchange resin for the isotope ions which are dissociated in the form of their hydroxides.

When an isotope has a relatively small molecular weight such as deuterium and boron, the isotope mass ratio deviates from unity, and chemical separation methods such as absorption or distillation may be utilized for separation. However, the separation factor per unit stage is not large so that efficient separation is still considerably difficult. On the other hand, uranium has a large atomic weight and the mass ratio of $^{235}U/^{238}U$ is close to unity, so that chemical separation has been dismissed as impractical.

Specifically, uranium separation using an ion exchange resin has been tried extensively in the laboratories of the United States Atomic Energy Commission according to Dr. F. H. Spedding's published report "Separation of Isotopes on Ion Exchange Column", U.S. A.E.C., Report ISC-475 (1954, declassified 1958). However, it was confirmed that uranium separation by ion exchange chromatography is impossible according to the report of A. C. Rutenbert and J. S. Drury, Journal of Inorganic and Nuclear Chemistry, 1969, Volume 31, page 2289 wherein it is stated that "In summary, it must be concluded on the experimental as well as theoretical grounds that the fractionation of U isotopes by chemical techniques is economically and technically unfeasible. The enrichment of uranium 235 is thus a task best left to the other isotope separation techniques."

For this reason only physical methods such as gas diffusion or centrifugation are practiced industrially. Notwithstanding these negative statements, it is an object of the present invention to provide a chemical technique for the fractionation of uranium isotopes.

It is a further object of the invention to provide an ion exchange process for the concentration of $U^{235}$ in an isotopic mixture of uranium compounds.

These and other objects are realized in accordance with the present invention pursuant to which a solution containing uranium ions is supplied adjacent one end of an ion exchange column whereby the uranium is picked up, after which an eluant containing other ions is supplied to the column, forming a uranium-containing band which advances slowly through the column. As the band reaches the end of the column the eluant is collected as separate fractions, the fractions differing in their isotope ratios as well as in their uranium concentrations.

The sequence of alternately supplying liquids providing uranium isotopes and eluants therefor may then be continued along with the collection of fractions of eluant as the uranium-containing bands move through the column.

The simultaneous concentration and dilution of uranium in this invention means that uranium 235 is concentrated in a specific portion, e.g. in the frontal or leading portion of a band moving through an ion exchange resin, and is diluted in the opposite part of the same band, while simultaneously uranium 238 is diluted in the frontal part of the band and concentrated in the rear part of the band. Of course, the uranium 236 isotope behaves silimarly dependent upon its atomic weight.

The enrichment of isotopes of uranium is to be due to the scission and/or formation of coordination bonds between uranium and ligand.

In this invention, the uranium compound exists as a coordination compound at least in one phase on the ion exchange resin or in an external liquid phase, and uranium 235 and uranium 238 are separated in the same band of U(IV) compound ion when the coordination bond of the U(IV) compound is broken and/or formed in the presence of ion exchange resin under the following general equation:

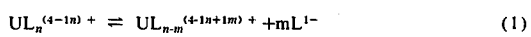

$$UL_n^{(4-1n)+} \rightleftharpoons UL_{n-m}^{(4-1n+1m)+} + mL^{1-} \qquad (1)$$

wherein
U is uranium,
L is ligand,
$UL_n$ is a coordination compound of U(IV),
1 is the valence of ligand, and
m and n are integers.

In this invention, a "coordination bond" is defined as a bond in which a metal ion has vacant orbitals and accepts electrons from the ligand. In other words, coordination bond has the same meaning as a complex bond. Coordination reaction is a reaction in which solvent molecules solvated on metal are replaced by a ligand in aqueous solution. The coordination of uranium is shown in the general formula as follows:

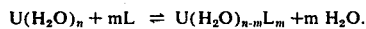

$$U(H_2O)_n + mL \rightleftharpoons U(H_2O)_{n-m}L_m + m H_2O.$$

As the reaction proceeds, the uranium coordination compound $UL_n$ finally has plural ligands.

In the practice of the invention, the ion exchange resin serves to effect the scission and/or formation of the coordination bond of the U(IV) compound ion. Also, it serves as a migration medium for the bands of U(IV) compound and eluant ions. Simultaneously the ion exchange resin serves to superimpose the effect of separation of U(IV) compound isotopes caused by scission and/or formation of the coordination bond, by repeating the absorption and elution of the U(IV) compound ion.

This function of the ion exchange resin is explained as follows:

U(IV) compound isotope ions on the ion exchange resin are in equilibrium with external solution, and advance as bands in the direction of the flow of the eluant. The separation of uranium 235 and uranium 238 is to occur by formation of coordination compounds, both in the liquid and ion exchange phases in stepwise fashion from $^{235}U$ and $^{238}U$ up to $^{235}UL_n$ and $^{238}UL_n$, viz:

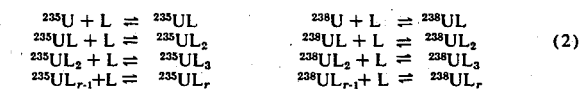

$$\begin{aligned}
^{235}U + L &\rightleftharpoons {}^{235}UL & {}^{238}U + L &\rightleftharpoons {}^{238}UL \\
^{235}UL + L &\rightleftharpoons {}^{235}UL_2 & {}^{238}UL + L &\rightleftharpoons {}^{238}UL_2 \\
^{235}UL_2 + L &\rightleftharpoons {}^{235}UL_3 & {}^{238}UL_2 + L &\rightleftharpoons {}^{238}UL_3 \\
^{235}UL_{r-1} + L &\rightleftharpoons {}^{235}UL_r & {}^{238}UL_{r-1} + L &\rightleftharpoons {}^{238}UL_r
\end{aligned} \qquad (2)$$

Isotopes $^{235}U$ and $^{238}U$ have a different reactivity with legand L. Consequently their coordination compounds have different stability constants. As $^{238}U$ has a greater mass and stronger tendency to react with a ligand L than $^{235}U$ of lighter mass, in the external liquid phase $^{238}U$ reacts with L more strongly than $^{235}U$, which results in making the average valences of $^{238}U$ lower than that of $^{235}U$. Since, in general, cation exchange resins adsorb higher valent ions preferentially, $^{235}U$ ions are more selectively adsorbed on the resin phase. Thus, the coordination bond of the $^{235}U$ ion broken in the external liquid phase to keep the equilibrium, and adsorbed more selectively by the ion exchange resin. This means that the coordination bond of $^{235}U$ is broken in liquid phase in the presence of ion exchange resin. On the other hand, isotope $^{238}U$ has a greater mass and reacts more strongly with ligand L than $^{235}U$ in the external liquid phase, and exists essentially in the form of lower valence U(IV) compound ions in the external liquid phase. Therefore, $^{238}U$ ion will flow downward through the ion exchange resin column with eluant and will be adsorbed in the lower part of column. Consequently, $^{235}U$ ion is adsorbed in the rear portion of the band of a cation exchange resin, while $^{238}U$ ion is adsorbed in the frontal portion of the band on a cation exchange resin. These bands advance in the direction of flow of the eluant by repeated adsorption and elution.

The foregoing explanation is based on the general rule that cation exchange resins adsorb higher valent ions more selectively than lower valent ions. However, this general rule does not always hold. For example, when the concentration of eluant in the external liquid phase is high, ion exchange resins sometimes adsorb lower valent ions more selectively than higher valent ions; thus sometimes the location of $^{235}U$ concentrated in the band can be opposite to what is set out above.

In this explanation, it has been assumed that the ion exchange resin is a cation exchange resin. But if the ion exchange resin is an anion exchange resin, or in case the selectivity of the ion exchange resin is reversed, the locations where $^{235}U$ or $^{238}U$ are concentrated are reversed.

Scission and/or formation of coordination bonds between U(IV) ions and ligands occurs at least in one of the liquid phase or ion exchange resin phase. As the isotope effect of scission and formation of the coordination bond is competitive, it is important to select the type of ion exchange resin, type of eluant, concentrations, type of ion of $^{235}U$ and $^{238}U$ in the system to maximize overall isotope effects in the system by super-imposition of individual isotope effects in each liquid and ion exchange resin phases; knowing the principles, such selections are within the skill of the art. As employed herein, the isotope effect is the difference in reactivity for formation of coordination bonds between $^{235}U$ and $^{238}U$, in other words, the separation of $^{235}U$ and $^{238}U$ either in liquid or resin phase by scission or formation of coordination bonds between metal and ligand.

Favorable super-imposition of individual isotope effects in both liquid and ion exchange resin phases exists where the metal isotope ion exists as the cation of U(IV) compound with a ligand in the external liquid phase and an anion exchange resin is utilized for forming another coordination bond with the U(IV) compound ions.

In order to conduct a successful separation of $^{235}U$-(IV) and $^{238}U$(IV) compound ions by scission and/or formation of the coordination bond of $^{235}U$(IV) and $^{238}U$(IV) compound ions, the state of the cordination bond of $^{235}U$(IV) and $^{238}U$(IV) compound ions in the external liquid phase may be different from those of $^{235}U$(IV) and $^{238}U$(IV) compound ions in the ion exchange resin phase. For example, the following are preferable conditions for separation of isotopes:

(1) The case in which U(IV) compound ions preferably have an ionic bond, despite that the U(IV) compound ions stay as lower valent coordination compound ions in average or zero valent coordination compound ion in the liquid phase, or, (2) The case in which U(IV) compound ions are essentially in the state of anions or cations, despite that U(IV) compound ions are respectively cations or anions in resin phase. When U(IV) compound ions are exchanged between resin phase and external liquid phase, it is easy to have a high separation factor of $^{235}U$(IV) and $^{238}U$(IV) ions by scission and/or formation of the coordination bond of $^{235}U$(IV) and $^{238}U$(IV) compound ions.

From this point of view, a preferred example is the case in which anion exchange resin is converted to the form of ligand that is preferably coordinated with U(IV) compound ions and, in the external liquid phase, the U(IV) compound ions exist in the form of cations. In order to realize this condition, it is important to decrease the concentration of external solution, or to prevent U(IV) compound ions from forming coordination compounds in external liquid phase, or to elute by using an eluant which does not form a coordination bond in liquid phase. For this purpose, the anion exchange resin is exchanged by anion ligand which tends to coordinate with U(IV) compound ions, and further U(IV) compound ions are adsorbed. After elution, ion exchange resin is regenerated into the type of ligand separately and, further, eluted preferably by eluant not to coordinate with U(IV) compound ions.

In order to apply this principle for uranium separation, it is preferable to convert the anion exchange resin with organic or inorganic acids which easily coordinates with uranium, and then the mixture of uranium isotope ions is supplied to the ion exchange column; thereafter the column is eluted with an eluant such as hydrochloric acid which does not tend to coordinate with uranium ion. In such application, although it is necessary to repeat regeneration, adsorption and elution of the ion exchange column, the degree of isotope concentration is considerably high.

Uranium 235 and uranium 238 separation is carried out by advancing alternating bands of U(IV) compound ions and another kind of ion on the ion exchange resin column in the direction of the flow of eluant. In case more than two pairs of alternating bands of U(IV) compound ions and eluant advance along the ion exchange column, not only is the unit production capacity of the column increased but also eluant can be utilized to elute successive isotope bands, so that the consumption of eluant per unit production of uranium iostopes is reduced. In order to form a band of U(IV) compound ions on the ion exchange column, the solution of U(IV) compound isotope ion mixture is supplied in a suitable quantity to produce a band of the desired width. When a plurality of U(IV) isotope bands are formed on a single ion exchange column, supply of eluant is interrupted periodically and isotope mixture solution is supplied to the column.

Solution of any U(IV) compound can be supplied to the ion exchange resin in this invention, and their composition is shown by the following general formula:

$$U(IV)L_{4/p} \text{ or } Y_m U(IV)L_{(4+mq)/p}$$

wherein
U(IV) is tetravalent uranium,
L is ligand of valence $p$,
Y is a cation of valence $q$, and
$m$ is an integer. Any compound of U(IV) which is soluble in water, an organic solvent, and/or an electrolyte solution can be utilized as U(IV) compound. Therefore, for example, L may be the anion of a halogen, an organic or inorganic acid, or a hydroxide or oxyhalide anion. Y may be a hydrogen ion, alkali metal ion, alkaline earth metal ion, and/or an ammonium ion. Representative U(IV) compounds include U(IV) chloride, U(IV) fluoride, U(IV) iodide, U(IV) sulfate, U(IV) nitrate, U(IV) phosphate, U(IV) perchlorate, U(IV) acetate, complex salt of alkali metal halides and U(IV) halides, as well as U(IV) compounds containing the U(IV) ion as an anion.

U(IV) compounds are supplied to the ion exchange column in the form of an electrolyte solution. The concentration of the U(IV) compound can be varied provided it is soluble in water or organic solvent.

When the U(IV) compound is not soluble in water or the solubility of the U(IV) compounds is limited, it is sometimes preferable to mix an organic solvent or other kind of electrolyte solution with the eluant in order to increase the solubility of the U(IV) compound. The U(IV) compound may be any compound, e.g. acid, base, salt and/or coordination compound, and sometimes the U(IV) compound is supplied to the system in the form of a compound combined with ligand, in the form of a solution or an electrolyte solution. Where the U(IV) compound has a strong coordination bond and scission of the coordination bond between U(IV) and ligand is to be conducted in the presence of the ion exchange resin, a high isotope effect can be obtained. In case the solution of U(IV) compound supplied to the column does not contain any ligand, it is essential to use an eluant containing a ligand compound.

Generally, U(IV) compound ions form a complex compound in the external liquid phase; therefore, the concentration of the supply of U(IV) compound is so selected that precipitation will not occur either in the ion exchange resin phase or the external liquid phase. The concentration of U(IV) compound is preferably about $10^{-4}$ to 10 mole/l, most preferably about 1 to $10^{-3}$ mole/l.

Also, the pH of the U(IV) compound solution is so selected that precipitation does not occur. Especially in case U(IV) compound ions are utilized together with an organic compound, it is possible to choose a specific organic compound which does not precipitate over a wide range of pH.

The U(IV) compound is supplied to the ion exchange column in sufficient amount to form a band of U(IV) ions of substantial width along the ion exchange column.

In case a plurality of bands exist along the column, it is preferable that each band be about 2 to 1,000 cm in width. Generally, regardless of the quantity of U(IV) compound ions supplied to produce a single band, the width of the band on the ion exchange column is influenced by the characteristics of the ion exchange resin, the exchange velocity of the ion exchange resin, the concentration of the isotopes in liquid phase, the coordination stage of the ligand, the operating temperature, the concentration of eluant, selectivity of the resin, etc. When the width of the band expands during migration, the production rate of $^{235}$U(IV) and $^{238}$U(IV) per unit volume of resin decreases. Therefore, it is important to adjust the above influences to minimize the diffusion of U(IV) compound ion bands on the ion exchange resin column, preferably within about 10 to 1,000 cm, in case a plurality of bands are eluted by a common eluant.

The U(IV) compound ions adsorbed on the ion exchange resin advance in the form of dissociated ion or coordinated ion with ion exchange group, ligand type ion exchange group.

In some cases, the U(IV) ions or ions comprising U(IV) may be a cation and absorbed by a cation exchange resin. U(IV) groups sometimes in other cases react with a plurality of anions of ligand or eluant to form an anion, and are adsorbed by an anion exchange resin. For example, the U(IV) compound ion may be a cation or anion in accordance with the following equation:

$$U^{4+} + nL \rightleftharpoons UL_n^{-(n-4)}$$

The eluant advances the bands of isotope in the direction of flow of eluant. During this migration, anionic or cationic U(IV) compound ions are eluted from the ion exchange resin, and further U(IV) compound ions are adsorbed again on adjacent groups of the ion exchange resin. These operations are repeated during the whole process of advance. Therefore, the composition and concentration of the eluant are so selected that not only are U(IV) compound ions eluted from the ion exchange resin but also adsorbed from the external liquid phase by the ion exchange resin while maintaining the equilibrium between ion exchange resin and external liquid phase.

The eluant may be a salt of an organic or inorganic acid, an acid, base and/or an electrolyte solution, so long as it is soluble in water or organic solvent and dissociable to form an electrolyte solution.

Therefore, the eluant may be any kind of compound except a U(IV) compound, including even a U(VI) compound.

In case the initial U(IV) compound does not conatin any ligand, the eluant will have to contain a ligand which is an electron donor atom or atomic group. In this case, the eluant will be an electron donor dissociable in aqueous solution and, due to dissociation, it has a counter-ion L. In case either the initial isotope compound contains ligand or the ion exchange group contains ligand, the eluant need not have a ligand.

It is preferable that the eluant has an isotope effect either in the ion exchange phase or external liquid phase. By "isotope effect" it is meant that the U(IV) compound ions have a different affinity for eluant depending upon the atomic weights of isotopes. In order to have a sufficient isotope effect, those U(IV) compound ions are preferred which form coordination compounds with the eluant.

In case a cation exchange resin is used, the U(IV) compound ion forms the complex compound $UL_n^{+(4-1n)}$ by the reaction with L. Therefore the eluant is preferably a compound which reduces the positive valence of U(IV). In case an anion exchange resin is utilized, an eluant is preferred which increases the absolute value of the negative valence of U(IV).

It is preferable that the eluant has approximately the same tendency to be adsorbed by the ion exchange resin as the U(IV) compound ions. Especially when a U(VI) compound is utilized as eluant alternating bands of U(IV) compound and U(VI) compound are formed on the ion exchange resin and migrate in the direction of the flow of eluant. In this case, uranium 235 migrates from the band of U(VI) compound ions into the U(IV) compound band, and uranium 238 migrates from the band of U(IV) compound into the band of U(VI) compound. Consequently, the concentration effect of uranium 235 in the band of U(IV) compound ions is superimposed by the separate concentration effect both in the band of U(IV) compound and U(VI) compound ions. Therefore, uranium 235 is effectively enriched in this kind of application.

In this case, uranium 235 is enriched in either the frontal or rear part of the band of U(IV) compound ions. This also is the case when other eluants are utilized.

As stated previously, the eluants are acids or salts, e.g. one or more of mineral acids, organic acids, their salts and preferably mixtures of salt and acid. As the eluant may form a coordination compound with U(IV) compound ions, solutions of organic or inorganic compounds containing, e.g. halogen, nitrogen and/or sulfur atoms, are preferably utilized as eluant.

Typical examples of these compounds are:

1. Inorganic acids such as sulfuric acid, hydrochloric acid, hydrobromic acid, phsophoric acid, carbonic acid, perchloric acid, sulfurous acid, and the like.
2. Alkali metal, alkaline earth metal and ammonium salts of the above inorganic acids.
3. Mixtures of salt (2) and inorganic acid (1).
4. 
   a. Saturated aliphatic acids, such as formic acid, butyric acid, propionic acid, substituted aliphatic acids such as chloroacetic acid, bromoacetic acid, glycolic acid, glyoxylic acid, cyanoacetic acid, chloropropionic acid, and the like.
   b. Aromatic acids and their substitution products such as benzoic acid, naphthioc acid, phenylacetic acid, toluic acid, salicyclic acid, and the like.
   c. Polybasic acids such as oxalic acid, malonic acid, succinic acid, adipic acid, fumaric acid, tartaric acid, citric acid, and the like, as well as polybasic acids substituted by hydroxyl, aldheyde, keto or halogen groups.
   d. Unsaturated organic acids and their substitution products such as acrylic acid, methyacrylic acid, crotonic acid, and the like.
5. An ammonium salt salt, substituted ammonium, alkali metal or alkaline earth metal salt of the above organic acids.
6. Bases such as sodium hydroxide, potassium hydroxide, ammonia, primary amine, secondary amine, tertiary amine, and quaternary ammonium hydroxides and their salts.
7. Organic compounds containing sulfur, oxygen and/or nitrogen atoms.
8. Chelating agents such as ethylenediaminetetraacetic acid, quinoline, nitrilo-triacetate, and the like, and their salts.
9. Organic and inorganic compounds which dissociate in water and/or solvents, such as fluorides, oxyfluorides, coordination compounds containing fluorine atoms, inorganic fluorine derivatives such as fluoroboric acid or metal salts, organic fluorine compounds such as alkylammonium fluoroborate, and the like.
10. Cyano compounds that dissociate in water and/or solvent, such as cyanide and its double salt, cyanamide, cyanate, thiocyanate, and the like.
11. Polyelectrolytes which form coordination compounds in liquid phase, such as polymeric acids, e.g. polystyrene sulfonic acid, polyacrylic acid, copolymers of acrylic acid and styrene sulfonic acid, copolymers of styrene sulfonic acid or acrylic acid and vinyl alcohol, and the like, preferably those having a molecular weight in excess of about 500.
12. Electrolytes differing from the isotope ions on the ion exchanger.
13. U(VI) compound.

Any kind of U(VI) compound may be utilized, such U(VI) compound generally having the following formula:

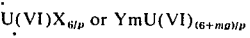

wherein

U(VI) is hexavalent uranium,
X is a anion of valence $p$ or $O_2$,
$p$ is an integer,
Y is a cation of valence $m$, and
$m$ is an integer.
If X is $O_2$, preferably Y is mono- or divalent.

As noted, any U(VI) compound can be used as eluant which is soluble in water, organic solvent or electrolyte solution. Examples of U(VI) compounds which can be used include the fluoride, chloride, bromide, iodide, sulfate, nitrate, phosphate, perchlorate, formate, acetate, and the like.

Solvents, especially organic solvents containing nitrogen, oxygen, and/or sulfur atoms can coordinate with uranium atoms and may be utilized together with eluant. Such solvents include carbitol, tributyl phosphate, trioctylamine, diethyl ether, other alcohols, amines and ethers.

The concentration of eluant is such that precipitation of U(IV) ions will not occur in either the external liquid phase or ion exchange phase. Most preferably the concentration of eluant is about 10 to 0.005 mole per liter.

The flow velocity of eluant may vary widely but should be greater than the velocity of advance of the band through the ion exchange resin.

The migration velocity or velocity of advance of the U(IV) compound ions is influenced by the flow velocity of eluant and is preferably about 0.1 to 1,000 cm/hr.

The temperature during the process may vary widely, e.g. about 0° to 100°C or the boiling point of the eluant. It is determined by considering various factors, e.g. stability of ion exchange resin, etc. Generally, the higher the temperature of eluant, the higher the velocity of adavnce of the band; the higher the velocity of advance, the less the mixing of isotopes.

Generally speaking, different from conventional ion exchange operation, uranium isotope separation is seriously influenced by the exchange velocity of U(IV) compound ions between resin phase and external liquid phase. It is especially essential to prevent mixing of U(IV) compound ions in the region of concentration in the band in order to maximize the concentration of uranium 235. However, when the percentage of cross-linking of the ion exchange resin is increased in order to have a higher isotope separation with an ordinary ion exchange resin, it is inevitable to have some mixing of separated isotopes on the ion exchange resin, because of the considerably low exchange velocity of conventional resins. This may be due to relatively slow diffusion velocity of isotope ions to penetrate in or to come out of the core of the resin particle. Especially in the concentration of uranium 235 by using U(IV) compound ions the valence of U(IV) is high. Therefore, the exchange velocity of U(IV) ion between resin phase and external liquid phase is considerably low. This means that the concentration of uranium 235 is especially difficult by the ion exchange method due to the mixing of uranium 235 and uranium 238.

Thus, it was known to be difficult to achieve the separation of uranium 235 using conventional resins, either in the frontal or rear part of the band where separation occurs.

Therefore, it is preferable to operate at a temperature of about 30° to 90°C for good separation of uranium 235 and 238. Mixing of uranium 235 and uranium 238 is more serious in case concentration occurs in the rear part of the band rather than in the frontal part of the band. Also, the exchange velocity between ligand and metal ions in the external liquid phase is not rapid enough; especially if an organic ligand is utilized the exchange velocity of ligand is usually slow, and it is necessary to increase the operating temperature in order to provide sufficient velocity for ligand exchange reaction on the ion exchange resin or to provide a high enough rate of scission and/or formation of the bond. The solution U(IV) compound ion and eluant are supplied adjacent the end of the column. Eluant flows generally downwardly along the column, but sometimes upwardly from the bottom. In case the ion exchange column is installed horizontally, both the U(IV) compound solution and the eluant flow horizontally, and the uranium bands advance horizontally. Effluent of eluant is obtained from the opposite side of influent.

The simultaneous concentration and dilution of uranium 235 and uranium 238 is carried out in the frontal part or rear part of the band. In the middle part of the band the isotope ratio is approximately the same as that of the initial material, but the width of the middle part of the band decreases with migration distance and the widths of both the frontal part and the rear part of the band increases as uranium separation proceeds.

The higher separation factor per unit stage, the longer the column and the higher the concentration gradient of the end part of the band, the higher is the percentage of separation.

The ion exchange resin is the medium for advance of the U(IV) compound ions as well as the medium for separation of uranium 235 and uranium 238. Therefore, another function of the ion exchange resin is to adsorb U(IV) isotope ions of higher valence selectively and concentrate uranium 235 and uranium 238 in different locations of the band due to the difference in reactivity between the U(IV) compound ions and ligand. The ion exchange resin also fractionates the uranium isotope ions depending on the difference in trends of the coordination bond during elution and results in super-imposition of the isotope effect. From this point of view, any ion exchange resin having selectivity for ions of differing valence can be utilized for this invention. However, in order to carry out effective concentration of isotopes without mixing of uranium 235 and uranium 238, it is important to have a higher velocity for the exchange reaction between ion exchange resin and external liquid phase. In this respect, conventional ion exchange resins such as Amberlite or Dowex are not feasible in preventing isotope mixing of uranium 235 and uranium 238 so they are not suitable to be utilized for uranium 235 separation. It is preferable instead to use an ion exchange resin of porous structure and high crosslinking in practicing the invention.

Various methods for the preparation of porous exchange resin has been proposed for the prompt adsorption and regeneration of ions.

The suitable ion exchange resin for the concentration of isotopes can be selected from the above kind of ion exchange resins. Porosity of the resin is expressed in this invention by the apparent density i.e., the weight (gram) of dry resin per unit volume (cc) of wet resin. This apparent density is measured by using Na-type resin as to cation exchange resins and by Cl-type resin as to anion exchange resins. The porosity of the resin increased with decrease of the apparent density. In order to have effective concentration of isotopes of this invention, particularly, the apparent density of cation exchange resins, for example, sulfonic acid type cation exchange resin, is preferably less than 0.400; the apparent density of anion exchange resin, for example, type-I anion exchange resin which is the crosslinked polystyrene chloromethylated and then aminated with trialkylamine such as trimethyl amine is preferably less than 0.340; the apparent density of anion exchange resin, for example, type-II anion is preferably less than 0.400; the apparent density of cation exchange resin of carboxylic acid type is preferably less than 0.340.

In order to conduct effective separation of isotopes of this invention, it is very important to prevent the isotopes separated on the band from mixing due to the slow adsorption of elution between the resin phase and the liquid phase. For this purpose, the mesh (or diameter) of ion exchange resin is preferably 5 to 500 mesh (4 to 0.03 mm in diameter). The preferable mesh or diameters are selected in accordance with the porosity, the percentage of crosslinkage of the resin and operation temperature of isotope separation. Most preferable mesh of the resin in this invention is 50 to 200 mesh (0.29 to 0.04 mm in diameter).

The exchange capacity of the ion exchange resin, percentage of crosslinking and composition of resin are selected in order to realize the maximum concentration effect of uranium 235. The exchange capacity of the ion exchange resin is preferably about 1 to 10 milliequivalents per gram of dry resin in the homogeneous part of the ion exchange resin. It is important to consider the distribution of the ion exchange groups in the ion exchange resin in order to prevent the mixing of uranium 235 and uranium 238 in the resin. In other words, unlike conventional resins, if the ion exchange groups are limited to the surface of the resin, the velocity of the exchange reaction is improved and mixing the uranium 235 and uranium 238 will be prevented. However, if the exchange groups are contained in the centers of the ion exchange resin particles, it often takes time to exchange those ions in the central parts of the resin particles and this causes mixing of isotopes. To this end, the ion exchange groups are preferably no more than about 0.02 to 0.15 mm deep from the surface of the resin; this depth should be no more than about 90% of the radius, e.g. about 10 to 90%. This can be accomplished by providing the ion exchange groups on the surface of spherical polymeric bodies of inorganic material such as glass or organic material such as Teflon polyfluorocarbon to the desired depth. Base polymers for the ion exchange resin sometimes are reacted to provide the desired depth of sulfonic acid or amine groups on the surface of the ion exchange resin. These ion exchange resins having exchange groups only on the surface result in superior uranium concentration without sacrificing the total exchange capacity per unit volume of the ion exchange resin column, because the volume occupied by the center core which is free of ion exchange groups is rather limited in comparison with the total volume of the ion exchange resin. The exchange capacities mentioned above are exhibited by the surface layer of such ion exchange resins.

Although it is preferable to have ion exchange resins of higher crosslinking in order to have higher separation, mixing of uranium isotopes increases with the percentage of crosslinking. Therefore, it is important to control the percentage of crosslinking for preventing mixing of uranium 235 and uranium 238, e.g. a percentage of crosslinking less than about 50% and preferably about 5 to 25%, especially if the ion exchange resin has a high porosity. Crosslinking results from the presence of diene molecules in the material being polymerized, e.g. a monoolefin such as styrene plus a diene such as divinylbenzene. The percent crosslinking as employed hereinabove has reference to the percent by weight of diene in the monomer material being polymerized.

Generally, the ion exchange resin particles are spherical but shapes such as fibers or membranes can be used provided the exchange velocity is fast. The diameter of the fiber or the thickness of the membrane will correspond to the diameter of the sphere for the parameters discussed hereinabove.

The ion exchange groups of cationic resins are sulfonic acid or carboxylic acids while those of anion exchange resins are primary, secondary or tertiary amines and/or quarternary ammonium groups. Amphoteric ion exchange resins having both amine and acid groups can also be utilized, e.g. chelate resins such as $RN(CH_2COONa)_2$ or

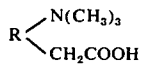

wherein R is an organic group.

As a base polymer for the ion exchange resin, there are preferred copolymers of styrene, divinylbenzene with acrylic or methacrylic acid, of an acrylic or methacrylic acid ester, vinylpyridine, and the like.

Preferred cation exchange resins include the sulfonation product of a copolymer of styrene and divinylbenzene, crosslinked polystyrene, copolymer of acrylic or methacrylic acid with divinylbenzene, or the hydrolysis product of the copolymer of an acrylic or methacrylic acid ester with divinylbenzene.

Preferred anion exchange resins are selected from the group consisting of chloromethylated and aminated copolymers of crosslinked polystyrene, copolymer of vinylpyridine and divinylbenzene, or their quarternized ammonium products.

Preferred resins are the products of amination and sulfonation of the copolymer of styrene and divinylbenzene, or the product of amination of a copolymer of acrylic or methacrylic acid, or of a copolymer of divinylbenzene with a vinyl compound having sulfonic acid groups. Synthetic or natural zeolites can be utilized, and also other supporting materials such as alumina can be incorporated into the ion exchange resin.

Uranium 235 and uranium 238 can be concentrated or diluted simultaneously by the method of this invention through direct exchange of U(IV) ions, by the direct coordination, or indirect coordination, through other ligands of the ion exchange resins. In any case, the U(IV) ions are directly or indirectly bonded to the ion exchange group of the ion exchange resin, and are eluted in the direction of the flow of eluant.

Separation using ligand type exchange resins are convenient to separate uranium isotopes. Suitable ligands are halogen, especially fluorine compounds, or cyano-containing compounds or ligand of the above-mentioned eluant.

As a typical example of such application, when an anion exchange resin is exchanged by an anion containing ligand, e.g. sulfuric acid, and a solution of a U(IV) isotope compound such as U(IV) chloride which does not contain ligand compound is utilized for isotope separation, the U(IV) ion exists in the form of a cation in the external liquid phase, and is adsorbed as an anion on the anion exchange resin. Thus, a high percentage of separation of isotopes of the U(IV) ion is obtained.

Generally speaking, depending upon the bond strength between ion exchange resin and U(IV) ion, the kind and concentration of eluant can be adjusted.

It is sometimes advantageous to cover the surface of the ion exchange resin by a high polymer film having the same electric charge as the counter-ion of the ion exchange resin, in order to limit the size of the ions entering the ion exchange resin, to prevent especially large complex ions from entering the ion exchange resin. In such event the separation of U(IV) is improved due to the separate distribution of the coordination compound ion through the external liquid and resin phases of the ion exchange resin depending upon the size of the coordination compound ion. In such a manner, a relatively low molecular weight polymer having the same charge as the counter-ion of the ion exchange resin may be reacted or adsorbed by the ion exchange resin.

In order to absorb U(IV) compound ions, the ion exchange resin is rinsed with an electrolyte solution such as eluant, acid, salt ligand compound, or metal or ammonium hydroxide. For instance, for absorption of U(IV) ions, by a cation exchange resin the rinse is with acid or eluant, and by an anion exchange resin the rinse is with hydroxide, base or eluant.

If an eluant rinse is inadequate to absorb U(IV) compound ions, the ion exchange resin may be regenerated by other kind of regenerants, for example a cation exchange resin may be regenerated by acid and/or salt solution containing ligand, and an anion exchange resin by base and/or acid or salt solution containing ligand.

The ion exchange resins generally are filled in a column or tube and utilized for the separation of U(IV) ion isotopes. The separation of U(IV) ions is carried out through one or more columns in series. The height of the column depends upon the one stage separation factor or percentage of concentration per unit length of the column. For example, it is necessary to have about 10 to 1,000 meters of distance of advance of U(IV) ion in order to concentrate uranium 235 from 0.0072% in a natural uranium to 3%. The distance for the concentration is determined by one stage separation factor (E) and the cycle of the passage in the same column.

The effluent of one column can be concentrated in a separate column successively in order to increase uranium 235 concentration. In the event a plurality of bands of isotopes exist in a single column, a single eluant can elute all the bands in series. If the diffusion of the band at its trailing end is aggravated, the end of one band will reach the front of the next band, and separation stops. Therefore, control of band diffusion is important in this process. Gradually, each U(IV) compound ion band migrates or advances to the end of the column and is eluted by eluant, leaving the column as effluent.

The concentrated fraction of uranium 235, a fraction having the same isotope as the raw material and a fraction depleted in uranium 235 are classified either into product or waste. If the concentration and dilution of uranium 235 are not sufficient, effluent from the column is sent to another column and further concentrated. The middle fraction of each band can be added to raw material and recycled for further separation of isotopes. There can also be sub-fractions.

Diluted uranium 235 solution, concentrated uranium 235 solution or the middle fraction having the same isotope ratio as the raw material can be separately sent to other ion exchange columns having equivalent concentrations of isotopes and further concentration or dilution can be performed in a cascade system.

As explained in detail above, the method of uranium 235 separation of this invention is based on the difference in chemical affinity of uranium 235 and uranium 238 so that the energy consumption is negligible in comparison with other physical methods. Also, the distance of one theoretical plate is considerably small, for example, about less than 10 millimeters, and extensive concentration of uranium 235 is carried out in a relatively small column. Therefore, if the concentration is carried out in this process, many theoretical plates can be operated without any complicated cascade system in order to have a high concentration of uranium 235.

This is quite different from the gas diffusion process which has a separation factor of about 1.003 for each stage of operation and thus needs numerous cascade stages. Therefore, the capital installation cost for practicing this invention is small compared with the gas diffusion process. Also the process is simplified in comparison with the gas diffusion process which requires an expensive and corrosive material such as U(VI) fluoride.

The foregoing explanations are based on use of a stationary bed of ion exchange resin but it is also possible to use a moving bed of ion exchange resin. In this case, alternating bands of uranium and of other ions will be present on the moving bed and these bands will advance in the direction of flow of eluant. Also, when the bed of ion exchange resin is moving or fluidized, it is possible to tap effluent of predetermined concentration from a definite position of the column by adjusting the velocity of the movement or fluidization of resin and the velocity of eluant.

The invention will be further described in the following illustrative examples wherein all parts are by weight unless otherwise expressed.

EXAMPLE 1

A column of 10 cm inner diameter and 12 meter length steel pipe lined with fluorocarbon polymer was filled with a sulfate type anion exchange resin prepared by chloromethylation and amination with dimethylaminoethanol of the copolymer of styrene and 5% divinylbenzene, the apparent density of the above chloride type resin being 0.310 gram dry resin per cc of wet resin. An eluant of 0.70 M ammonium sulfate solution adjusted to pH 1.0 with sulfuric acid was applied continuously to the top of the column at a flow rate of 2.2 liters/hour. After 12 hours, the eluant supply to the column was interrupted, and was switched to a solution of 0.7 M amonnium sulfate and 0.01 M U(IV) chloride, having a molar isotope ratio $235_U/238_U$ of 0.007253. 16.5 liters of said mixed solution of U(IV) chloride and ammonium sulfate was supplied to the top of the column at a flow rate of 2.2 liters/hour, and then flow of eluant of 0.7 M amonnium sulfate was resumed at the same flow rate. By repeating these operations, alternating bands of U(IV) sulfate complex ion and eluant ion were formed in the anion-exchange resin column, and all bands advanced in parallel in the direction of flow of eluant. At the steady state, ten pairs of said bands were formed in the anion exchange column of 12 m length, and the width of each U(IV) complex ion band at the outlet of the column was about 108 cm, and that of each eluant band was 14 cm. The time required for each band to move from the top to the bottom of the column was about 177 hours. The effluent of U(IV) complex ion band was collected at the bottom of the column separately as several fractions. The first 5 liters of effluent were collected as the first fraction when each U(IV) complex ion band reached the bottom of the column, the next 22 liters were collected as the second fraction, and further 8 liters as the third fraction. U(IV) compound ion concentration and isotope ratios $^{235}U/^{238}U$ were analyzed as to each fraction, a mass spectroscope being used for isotope ratio determination.

The concentration of U(IV) compound ion and $^{235}U/^{238}U$ isotope ratios of said three fractions were, respectively, $1.01 \times 10^{-3}$ M and $^{235}U/^{238}U = 0.008210$, $6.14 \times 10^{-3}$ M and $^{235}U/^{238}U = 0.007245$ (nearly equal to the feed solution), and $0.71 \times 10^{-3}$ M and $^{235}U/^{238}U = 0.006302$. Thus uranium 235 was concentrated by about 13% in the frontal part of the effluent of each U(IV) complex ion band.

EXAMPLE 2

A column of 10 cm inner diameter and 10 meter length steel pipe lined with fluorocarbon polymer was filled with a hydrogen type cation exchange resin prepared by sulfonation of a copolymer of styrene and divinylbenzene. An eluant of 1.0 M sulfuric acid was supplied continuously to the top of the column at a flow rate of 2.0 liters/hour. After 6.5 hours, eluant supply to the column was interrupted, and was switched to 0.47 M U(IV) chloride solution, having a $^{235}U/^{238}U$ isotope ratio of 0.007275. One liter of the U(IV) chloride solution was supplied to the top of the column, and then flow of eluant of 1.0 M sulfuric acid was resumed at the same flow rate. By repeating these operations, alternating bands of U(IV) sulfate complex ion and eluant ion were formed in the cation exchange resin column, and all bands advanced in parallel in the direction of flow of the eluant. At the steady state, nine pairs of said bands were formed in the cation exchange column of 10 m length, and the width of each U(IV) complex ion band at the outlet of the column was about 125 cm, and that of each eluant band was 17 cm. The time required for each band to travel from the top to the bottom of the column was about 56 hours. The effluent of U(IV) complex ion band was collected at the bottom of the column separately as several fractions. 2.0 liters of effluent were collected as the first fraction when each U(IV) complex ion band reached the bottom of the column, and then the next 2.0 liters as a secong fraction, and further 10 liters as a third fraction. U(IV) compound ion concentration and isotope ratios $^{235}U/^{238}U$ were analyzed in each fraction, a mass spectroscope being used for isotope ratio determination.

The concentration of U(IV) compound ion and $^{235}U/^{238}U$ isotope ratios of said three fractions were, respectively, $46 \times 10^{-3}$ M and $^{235}U/^{238}U = 0.00715$, $140 \times 10^{-3}$ M and $^{235}U/^{238}U = 0.00728$ (nearly equal to the feed solution), and $10 \times 10^{-3}$ M and $^{235}U/^{238}U = 0.00738$. Thus uranium 235 was concentrated by about 1.5% in the rear part of the effluent of each U(IV) complex ion band.

EXAMPLE 3

A column of 10 cm inner diameter and 4 meter length steel pipe lined with fluorocarbon polymer was filled with a hydrogen type cation exchange resin prepared by sulfonation of the copolymer of styrene and divinylbenzene. An eluant of 0.5 M citric acid was supplied continuously to the top of the column at a flow rate of 2.0 liters/hour. After 2.5 hours, eluant supply to the column was interrupted, and was switched to 0.40 M U(IV) sulfate solution, having a $^{235}U/^{238}U$ isotope ratio of 0.00728. 470 cc of said solution of U(IV) sulfate was supplied to the top of the column, and then eluant flow was resumed at the same flow rate. By repeating these operations, alternating bands of U(IV) complex ion and eluant ion were formed in the cation exchange resin column, and all bands advanced in parallel in the direction of flow of eluant. At the steady state, thirteen pairs of said bands were formed in the cation exchange column of 4 m length, and the width of each U(IV) complex ion band at the outlet of the column was about 26 cm, while the citric acid band was 6.5 cm. The time required for each band to travel from the top to the bottom of the column was about 31 hours. The effluent of U(IV) complex ion band was collected at the bottom of the column separately as several fractions. 1 liter of effluent was collected as a first fraction when each U(IV) complex ion band reached the bottom of the column, the next liter as the second fraction, and the next two liters as the third fraction. U(IV) compounds ion concentration and isotope ratios $^{235}U/^{238}U$ were analyzed in each fraction, a mass-spectroscope being used for isotope ratio determination.

The concentration of U(IV) compounds ion and $^{235}U/^{238}U$ isotope ratios of said three fractions were, respectively, 0.043 M and $^{235}U/^{238}U = 0.007253$, 0.122 M and $^{235}U/^{238}U = 0.00727$ (nearly equal to the feed solution), and 0.036 M and $^{235}U/^{238}U = 0.00734$. Thus uranium 235 was concentrated by about 0.8% in the rear part of the effluent of each U(IV) complex ion band.

EXAMPLE 4

A column of 10 cm inner diameter and 12 meter length steel pipe lined with fluorocarbon polymer was filled with a hydrogen type cation exchange resin prepared by sulfonation of the copolymer of styrene and 10% divinylbenzene, the apparent density of such resin in sodium form being 0.260 grams of dry resin per cc of wet resin. An eluant of 0.6 M lactic acid and 0.3 M ammonium chloride solution at 30°C adjusted to pH 1.0 with hydrochloric acid was supplied continuously to the top of the column at a flow rate of 4 liters/hour. After 6 hours, eluant supply to the column was interrupted, and was switched to a solution of 0.6 M lactic acid, 0.3 M ammonium chloride and 0.02 M U(IV) chloride, having a $^{235}U/^{238}U$ of 0.007253. 8 liters of the mixed solution of U(IV) chloride, lactic acid and ammonium chloride were supplied to the top of the column at a flow rate of 4 liters/hour, and then flow of eluant of 0.6 M lactic acid and 0.3 M ammonium chloride adjusted to pH 1.0 was resumed at the same feed rate. By repeating these operations, alternating bands of U(IV) lactate complex ion and eluant ion were formed in the cation exchange resin column, and all bands advanced in parallel in the direction of flow of the eluant. At the steady state, sixteen pairs of said bands were formed in the cation exchange column of 12 m length, and the width of each U(IV) complex ion band at the outlet of the column was about 59 cm, and that of each eluant band was 15 cm. The time required for each band to traval from top to bottom of the column was about 126 hours. The effluent of U(IV) complex ion band was collected at the bottom of the column separately as several fractions. 6.5 liters of effluent were collected as a first fraction when each U(IV) complex ion band reached the bottom of the column, the next 11.8 liters as a second fraction, and a further 7 liters as a third fraction. U(IV) compound ion concentration and isotope ratios $^{235}U/^{238}U$ were analyzed in each fraction, a mass-sectroscope being used for isotope ratio determination.

The concentration of U(IV) ion and $^{235}U/^{238}U$ ratio of said three fractions were, respectively, $1.8 \times 10^{-3}$ M and $^{235}U/^{238}U = 0.006910$, $11.0 \times 10^{-3}$ M and $^{235}U/^{238}U = 0.007250$ (nearly equal to the feed solution), and $1.5 \times 10^{-3}$ M and $^{235}U/^{238}U = 0.007612$. Thus uranium 235 was concentrated by about 4.9% in the rear part of the effluent of each U(IV) complex ion band.

EXAMPLE 5

A column of 10 cm inner diameter and 10 meter length steel pipe lined with fluorocarbon polymer was filled with a hydrogen type cation exchange resin made of sulfonated styrene-divinylbenzene copolymer. 1 liter of 2.0 M uranyl sulfate solution was supplied to the top of the column for 30 minutes at a flow rate of 2.0 liters/hour. Then 4 liters of 0.47 M U(IV) sulfate solution was supplied for 2 hours to the top of the column at a flow rate of 2.0 liters/hour, and then the flow of uranyl sulfate solution was resumed at the same flow rate. The $^{235}U/^{238}U$ isotope ratio of both solutions was 0.00728. By repeating these operations, alternating bands of U(IV) sulfate complex ion and uranyl sulfate complex ion were formed in the cation exchange resin column, and all bands advanced in parallel in the direction of flow of the eluant. At the steady state, 10 pairs of said bands were formed in the cation exchange column of 10 m length, and the width of a pair of U(IV) complex ion band and uranyl complex ion band at the outlet of the column was about 80 cm. The traveling time required for each band from the top to the bottom of the column was about 35 hours. The effluent of U(IV) complex band was collected at the bottom of the column separately as several fractions. 1.5 liters of effluent were collected as a first fraction when each U(IV) complex ion band reached the bottom of the column, the next 2.0 liters were collected as a second fraction, and further 1.5 liters as a third fraction. U(IV) compound ion concentration and isotope ratios $^{235}U/^{2-}$ $^{238}$U were analyzed in each fraction, a mass-spectroscope begin used for isotope ratio determination.

The concentration of U(IV) compound ion and $^{235}$U/$^{238}$ isotope ratios of said three fractions were respectively, 0.33 M and $^{235}$U/$^{238}$U = 0.00720, 0.47 M and $^{235}$U/$^{238}$U = 0.00727 (nearly equal to the feed solution), and 0.29 M and $^{235}$U/$^{238}$U = 0.00740. Thus uranium 235 was concentrated by about 1.5% in the rear part of the effluent of each U(IV) complex band.

EXAMPLE 6

The experiment was carried out by using the same apparatus and in the same conditions as those of Example 1, except that 1.0 M sulfuric acid was used as eluant. The results obtained were similar to those of Example 1.

EXAMPLE 7

A column of 10 cm inner diameter and 4 meter length steel pipe lined with fluorocarbon polymer was filled with a hydrogen type cation exchange resin prepared by sulfonation of styrene divinylbenzene copolymer. An eluant of 0.50 M sulfuric acid and 0.01 M sodium fluoride solution was supplied continuously to the top of the column at a flow rate of 2.0 liters/hour. After 54 hours, the eluant supply to the column was interrupted, and was switched to 0.1 M U(IV) sulfate, having a $^{235}$U/$^{238}$U ratio 0.00728. 8 liters of said U(IV) sulfate were supplied to the top of the column, and then eluant flow was resumed at the same flow rate. By repeating these operations, alternating bands of U(IV) complex ion and eluant ion were formed in the cation exchange resin column, and all bands advanced in parallel in the direction of flow of eluant. At the steady state, two pairs of said bands were formed in the cation exchange column of 4 m length, and the width of each U(IV) complex ion band at the outlet of the column was about 167 cm while that of each eluant ion band was 13 cm. The time required for each band to travel from the top to the bottom of the column was about 120 hours. The effluent of U(IV) complex ion band was collected at the bottom of the column separately as several fractions. 20 liters of effluent were collected as a first fraction when each U(IV) complex ion band reached the bottom of the column, the next 30 liters were collected as a second fraction, and further 50 liters as a thrid fraction. The concentration and $^{235}$U/$^{238}$U isotope ratios were analyzed in each fraction, a mass-spectroscope being used for isotope ratio determination.

The concentrarion of U(IV) compound ion and isotope ratios $^{235}$U/$^{238}$U of said three fractions were, respectively, 9.1 × 10$^{-3}$M and $^{235}$U/$^{238}$U = 0.00722, 12.5 × 10$^{-3}$M and $^{235}$U/$^{238}$U = 0.00727 (nearly equal to the feed solution), and 4.9 × 10$^{-3}$ M and $^{235}$U/$^{238}$U = 0.00736. Thus uranium 235 was concentrated by about 1.1% in the rear part of the effluent of each U(IV) complex ion band.

EXAMPLE 8

A column of 10 cm inner diameter and 12 meter length steel pipe lined with fluorocarbon polymer was filled with a hydrogen type cation exchanger made of glass beads 0.15 mm in diameter coated with a sulfonated copolymer of styrene and 12% divinylbenzene; the apparent density of such resin in sodium form was 0.250 gram dry resin per cc of wet resin. An eluant of 0.1 M citric acid and 0.45 M ammonium chloride solution adjusted to pH 1.1 with hydrochloric acid was supplied continuously to the top of the column at a flow rate of 4 liters/hour at a temperature of 60°C. After 12 hours the eluant supply to the column was interrupted, and was switched to an acidic solution of 0.1 M citric acid, 0.45 M ammonium chloride and 0.01 M of U(IV) chloride, having the isotope ratio $^{235}$U/$^{238}$U of 0.007253. 16 liters of said mixed solution of U(IV) chloride, citric acid and ammonium chloride were supplied to the column at a flow rate of 4 liters/hour, and then eluant flow was resumed at the same flow rate. By repeating these operations, alternating bands of U(IV) sulfate complex ion and eluant ion were formed in cation exchange resin column, and all bands advanced in parallel in the direction of flow of eluant. The temperature inside of the column was maintained at 60°C by a warm water jacket around the column. At the steady state, 12 pairs of said bands were formed in the cation exchange column of 12 m length, the width of each U(IV) complex ion band at the outlet of the column was about 79 cm, and that of each eluant ion band was 17 cm. The time required for each band to travel from top to bottom of the column was about 200 hours. The effluent of U(IV) complex ion band was collected at the bottom of the column separately as several fractions. The first 14 liters of effluent were collected as first fraction when each U(IV) complex ion band reached the bottom of the column, the next 24.5 liters as a second fraction, and further 15 liters as a third fraction. U(IV) compound ion concentration and $^{235}$U/$^{238}$U were analyzed in each fraction, a mass-spectroscope being used for isotope ratio determination.

The concentration of U(IV) compound ion and $^{235}$U/$^{238}$U isotope ratios of said three fractions were, respectively, 0.9 × 10$^{-3}$M and $^{235}$U/$^{238}$U = 0.006860, 5.2 × 10$^{-3}$M and $^{235}$U/$^{238}$U = 0.007245 (nearly equal to the feed solution), and 0.85 × 10$^{-3}$M and $^{235}$U/$^{238}$U = 0.007651. Thus uranium 235 was concentrated by about 5.5% in the rear part of the effluent of each U(IV) complex ion band.

EXAMPLE 9

A column of 10 cm inner diameter and 12 meter length steel pipe lined with fluorocarbon polymer was filled with a sulfate type anion exchange resin prepared by chloromethylation and amination with dimethylaminoethanol of a copolymer of styrene and 8% divinylbenzene, the apparent density of the chloride type resin being 0.303 gram of dry resin per cc of wet resin. 24 liters of solution of 0.01 M U(IV) chloride, having a $^{235}$U/$^{238}$U of 0.007253 was supplied to the top of the column at a flow rate of 2.4 liters/hour. After 10 hours, U(IV) chloride solution was interrupted and 0.8 M hydrochloric acid solution was supplied to the top of the column at the same flow rate at a temperature of 45°C. A single band of U(IV) sulfate complex ion was thus formed in anion exchange column, and advanced in the direction of flow of eluant, and the resin was converted to the chloride type. Then, 5M sulfuric acid solution was supplied to the top of the column at a flow rate of 10 liters/hour for about 20 hours, so that the resin was regenerated to the sulfate type. These operations were repeated periodically.

When the U(IV) complex ion band eluted by hydrochloric acid solution reached the outlet of the column, the width of the U(IV) complex ion band was about 53 cm. The time required for the band to travel from top to bottom of the column was about 125 hours. The effluent of U(IV) complex ion band was collected at the bottom of the column separately as several fractions. The first 3.5 liters of effluent were collected as a first fraction when each U(IV) complex ion band reached the bottom of the column, the next 6.3 liters as a second fraction, and further 3.5 liters as a third fraction. U(IV) compound ion concentration and isotope ratios $^{235}U/^{238}U$ were analyzed in each fraction, a mass-spectroscope being used for isotope ratio determination.

The concentration of U(IV) compound ion and $^{235}U/^{238}U$ of said three fractions were, respectively, $5.2 \times 10^{-3}$ M and $^{235}U/^{238}U = 0.007670$, $31.5 \times 10^{-3}$ M and $^{235}U/^{238}U = 0.007250$ (nearly equal to the feed solution), and $5.2 \times 10^{-3}$ M and $^{235}U/^{238}U = 0.006830$. Thus uranium 235 was concentrated by about 5.7% in the frontal part of the effluent of each U(IV) complex ion band.

EXAMPLE 10

A column of 10 cm inner diameter and 10 meter length steel pipe lined with fluorocarbon polymer was filled with a chloride type anion-exchange resin of 200 to 300 mesh prepared by chloromethylation and amination of the copolymer of styrene and divinylbenzene. An eluant of 6.0 M hydrochloric acid was supplied continuously to the top of the column at a flow rate of 2.0 liters/hour. After 3.2 hours the eluant supply to the column was interrupted, and was switched to a solution of 6.0 M hydrochloric acid and 0.1 M U(IV) chloride, having $^{235}U/^{238}U$ isotope ratio of 0.00728. 1.9 liters of the mixed solution of U(IV) chloride and hydrochloric acid were supplied to the top of the column, and then eluant flow was resumed at the same flow rate. By repeating these operations, alternating bands of U(IV) complex ion and chloride ion were formed in the anion exchange resin column, and all bands advanced in parallel in the direction of flow of the eluant. At the steady state, twelve pairs of said bands were formed in the anion exchange column of 10 m length, and the width of each U(IV) complex ion band at the outlet of the column was about 67 cm while that of each eluant ion band was 13 cm. The time required for each band to travel from the top to the bottom of the column was about 40 hours. The effluent of U(IV) complex band was collected at the bottom of the column separately as several fractions. The first 2 liters of effluent were collected as a first fraction when each U(IV) complex band reached the bottom of the column, next 3 liters as a second fraction, and a further 1 liter as a third fraction. U(IV) ion concentration and $^{235}U/^{238}U$ isotope ratios were analyzed in each fraction, a mass-spectroscope being used for isotope ratio determination.

The concentration of U(IV) complex ion and $^{235}U/^{238}U$ isotope ratios of said three fractions were, respectively, $19 \times 10^{-3}$ M and $235_U/238_U = 0.00743$, $48.5 \times 10^{-3}$ M and $235_U/238_U = 0.00726$ (nearly equal to the feed solution), and $6.4 \times 10^{-3}$ M and $235_U/238_U = 0.00724$. Thus uranium 235 was concentrated by about 2.2% in the frontal part of the effluent of each U(IV) complex ion band.

EXAMPLE 11

A column of 10 cm inner diameter and 12 meter length steel pipe lined with fluorocarbon polymer was filled with a sulfate type anion exchange resin prepared by chloromethylation and amination with trimethylamine of the the of styrene and 6% divinylbenzene, apparent density of the above chloride type resin being 0.250 gram dry resin per cc of wet resin. An eluant of 0.40 M ammonium sulfate solution adjusted to pH 1.0 with sulfuric acid was supplied continuously to the top of the column at a flow rate of 2.4 liters/hour at a temperature of 50°C. After 16 hours, the eluant supply to the column was interrupted, and was switched to an acidic solution of 0.4 M ammonium sulfate and 0.01 M U(IV) chloride, having a $235_U/238_U$ isotope ratio of 0.007253. 14.4 liters of the mixed solution of 0.01 M U(IV) chloride, 0.40 M ammonium sulfate of pH 1.0 was supplied to the column at a flow rate of 2.4 liters/hour, and then flow of eluant solution was resumed at the same flow rate. By repeating these operations, alternating bands of U(IV) sulfate complex ion and eluant ion were formed in the anion exchange resin column, and all bands advanced in parallel in the direction of flow of eluant. At the steady state, seven pairs of said bands were formed in the anion exchange column of 12 m length, and the width of each U(IV) complex ion band at the outlet of the column was about 129 cm, and that of the eluant ion band was 30 cm. The time required for each band to travel from the top to the bottom of the column was about 169 hours. The effluent of U(IV) complex ion band was collected at the bottom of the column separately as several fractions. The first 11.6 liters of effluent were collected as a first fraction when each U(IV) complex ion band reached the bottom of the column, the next 20.3 liters as a second fraction, and further 11.6 liters as a third fraction. U(IV) compound ion concentration and $235_U/238_U$ isotope ratios were analyzed in each fraction, a mass-spectroscope being used for isotope ratio determination.

The concentration of U(IV) compound ion and $235_U/238_U$ isotope ratios of said three fractions were, respectively, $1.0 \times 10^{-3}$M and $235_U/238_U = 0.008059$, $5.7 \times 10^{-3}$M and $235_U/238_U = 0.007251$ (nearly equal to the feed solution), and $0.9 \times 10^{-3}$ M and $235_U/238_U = 0.006450$. The the uranium 235 was concentrated by about 11% in the frontal part of the effluent of each U(IV) complex ion band.

EXAMPLE 12

A column of 10 cm inner diameter and 5 meter length steel pipe lined with fluorocarbon polymer was filled with a hydrogen type cation exchange resin prepared by sulfonation of a copolymer of styrene and 10% divinylbenzene, apparent density of the above resin in sodium form being 0.440 gram dry resin per cc of wet resin. An eluant of 0.040 M sodium fluoride, 0.200 M sodium chloride and 0.270 M hydrochloric acid was supplied continuously to the top of the column at a flow rate of 2.0 liters/hour. After 3.7 hours, eluant supply to the column was interrupted, and was switched to a solution of 0.04 M sodium fluoride, 0.2 M sodium chloride, 0.27 M hydrochloric acid and 0.020 M of U(IV) chloride, having a $235_U/238_U$ of 0.007253. 4 liters of the mixed solution of U(IV) chloride was supplied to the column at a flow rate of 2.0 liters/hour at a temperature of 30°C, and then eluant flow resumed at the same flow rate. By repeating these operations, alternating bands of U(IV) fluoride complex ion and eluant ion were formed in the cation exchange resin column, and all bands migrated in parallel in the direction of eluant. At the steady state, twelve pairs of said bands were formed in the cation exchange column of 5 m length, and the width of each U(IV) complex ion band at the outlet of the column was about 33 cm while that of each eluant was 10 cm. The time required for each band to travel from the top to the bottom of the column was about 67 hours. The effluent of U(IV) complex ion band was collected at the bottom of the column separately as several fractions. First 2.2 liters of effluent were collected as a first fraction when each U(IV) complex ion band reached the bottom of the column, the next 3.8 liters as a second fraction, and further 2.5 liters as a third fraction. U(IV) compound ion concentration and $235_U/238_U$ isotope ratios of said three fractions were, respectively, $2.6 \times 10^{-3}$ and $235_U/238_U = 0.007149$, $17.8 \times 10^{-3}$M and $235_U/238_U = 0.007252$ (nearly equal to the feed solution), and $2.3 \times 10^{-3}$ M and $235_U/238_U = 0.007358$. Thus uranium 235 was concentrated by about 1.4% in the rear part of the effluent of each U(IV) complex ion band.

EXAMPLE 13

A column of 10 cm inner diameter and 12 meter length steel pipe lined with fluorocarbon polymer was filled with a cation exchange resin prepared by sulfonating the surface of a copolymer of styrene and 15% divinylbenzene, apparent density of the above resin in sodium form being 0.320 gram dry resin per cc of wet resin. An eluant of 0.4 M sulfosalicylic acid and 0.4 ammonium chloride adjusted to pH 1.3 with hydrochloric acid was supplied continuously to the top of the column at a flow rate of 4 liters/hour at a temperature of 75°C. After 10 hours, eluant supply to the column was interrupted, and was switched to a solution of 0.4 M sulfosalicylic acid, 0.4 M ammonium chloride and 0.01 M of U(IV) chloride having a $235_U/238_U$ isotope ratio of 0.007253. 16 liters of the mixed solution of U(IV) chloride, sulfosalicylic acid and ammonium chloride were supplied to the column at a rate of 4 liters/hour, and the flow of the first eluant was resumed at the same flow rate. By repeating these operations, alternating bands of U(IV) complex ion and eluant ion were formed in the cation exchange resin column, and all bands advanced in parallel in the direction of the flow of eluant. At the steady state, twelve pairs of said bands were formed in the cation exchange column, and the width of each U(IV) complex ion band at the outlet of the column was about 91 cm while that of each eluant band was 9 cm. The time required for each band to travel from the top to the bottom of the column was about 160 hours. The effluent of U(IV) complex ion band was collected at the bottom of the column separately as several fractions. First 14 liters of effluent were collected as a first fraction when each U(IV) complex ion band reached the bottom of the column, next 21 liters as a second fraction, and further 16 liters as a third fraction. U(IV) complex ion concentration and $235_U/238_U$ isotope ratios were analyzed in each fraction, a mass-spectroscope being used for isotope ratio determination. The concentration of U(IV) compound ion and $235_U/238_U$ isotope ratios of said three fractions were, respectively, $0.96 \times 10^{-3}$M and $235_U/238_U = 0.006810$, $5.7 \times 10^{-3}$M and $235_U/238_U = 0.007250$ (nearly equal to the feed solution), and $0.90 \times 10^{-3}$M and $235_U/238_U = 0.007702$. Thus the uranium 235 was concentrated by about 6.2% in the rear part of the effluent of each U(IV) complex ion band.

EXAMPLE 14

A column of 10 cm inner diameter and 50 meter length steel pipe lined with fluorocarbon polymer was filled with a hydrogen type cation exchange resin prepared by sulfonating styrene-divinylbenzene copolymer. An eluant of 0.01 M sodium fluoride and 0.5 M sulfuric acid was supplied continuously to the top of the column at a flow rate of 2 liters/hour. After 54 hours, the eluant supply to the column was interrupted, and was switched to a solution of 0.1 M U(IV) sulfate having the isotope ratio $^{235}U/^{238}U$ of 0.00728. 8 liters of said U(IV) sulfate solution were supplied to the column at a rate of 2 liters/hour, and then eluant flow was resumed, at the same flow rate. Every 27 hours after eluant flow resumed, eluant supply was again interrupted temporarily, and 2 liters of water were supplied to the column. By repeating these operations, alternating bands of U(IV) sulfate complex ion and eluant ion were formed in the cation exchange resin column, and all bands advanced in parallel in the direction of eluant solution. At the steady state, about eighty pairs of said bands were formed in the cation exchange column of 50 m length, and the width of each U(IV) complex ion band at the outlet of the column was about 56 cm while that of eluant was 4 cm. The bands expanded slightly. The effluent of U(IV) complex ion band was collected at the bottom of the column separately as several fractions. First 6.7 liters of effluent were collected as a first fraction when each U(IV) complex ion band reached the bottom of the column, the next 10 liters as a second fraction, and further 16.7 liters as a third fraction. U(IV) compound ion concentration and $235_U/238_U$ isotope ratios were analyzed in each fraction, a mass-spectroscope being used for isotope ratio determination.

The concentration of U(IV) compound ion and $235_U/238_U$ isotope ratios of said three fractions were, respectively, $27.3 \times 10^{-3}$ M and $^{235}U$ was diluted, $37.5 \times 10^{-3}$M and $^{235}U/^{238}U = 0.00728$ (nearly equal to the feed solution), and $15 \times 10^{-3}$ M and $235_U/238_U = 0.01438$.

EXAMPLE 15

A column of 10 cm inner diameter and 8 meter length steel pipe lined with fluorocarbon polymer was filled with an anion exchange resin prepared by treating the copolymer of 4-vinyl-pyridine and 6% divinylbenzene with methyl iodide, the apparent density of the above chloride type resin being 0.340 gram dry resin per cc of wet resin. An eluant of a mixture of 0.1 M oxalic acid and 0.6 M ammonium chloride adjusted to pH 2.5 with ammonium hydroxide was supplied continuously to the top of the column at a flow rate of 4 liters/hour at a temperature of 60°C. After 12 hours, the eluant supply to the column was interrupted, and was switched to an acidic solution mixture of oxalic acid containing 0.1 M oxalic acid, 0.6 M ammonium chloride and 0.01 M of U(IV) chloride, having a $235_U/238_U$ isotope ratio of 0.007253. 12 liters of the mixed solution of U(IV) chloride and oxalic acid and ammonium sulfate was supplied to the column at a flow rate of 4 liters/hour, and then the eluant flow was resumed at the same flow rate. By repeating these operations, alternating bands of U(IV) oxalate complex ion and eluant ion were formed in the anion exchange resin column, and all bands migrated in parallel in the direction of the flow of eluant solution. At the steady state, ten pairs of said bands were formed in the anion exchange column of 8 m length, the width of each U(IV) complex ion band at the outlet of the column was about 67 cm and that of each eluant ion band was 15 cm. The time required for each band to travel from the top to the bottom of the column was about 145 hours. The effluent of U(IV) complex ion band was collected at the bottom of the column separately as several fractions. The first 11 liters of effluent was collected as first fraction when each U(IV) complex ion band reached the bottom of the column, the next 23 liters as a second fraction, and further 15 liters as a third fraction. U(IV) compound ion concentration and $235_U/238_U$ isotope ratios were analyzed in each fraction, a mass-spectroscope being used for isotope ratio determination.

The concentration of U(IV) compound ion and $235_U/238_U$ isotope ratios of said three fractions were, respectively, $0.75 \times 10^{-3}$M and $235_U/238_U = 0.007535$, $4.1 \times 10^{-3}$M and $235_U/238_U = 0.007245$ (nearly equal to the feed solution), and $0.60 \times 10^{-3}$ M and $235_U/238_U = 0.006966$. Thus uranium 235 was concentrated by about 3.9% in the frontal part of the effluent of each U(IV) complex ion band.

EXAMPLE 16

A column of 10 cm inner diameter and 8 meter length steel pipe lined with fluorocarbon polymer was filled with anion exchange resin prepared by chloromethylation and amination with trimethylamine of the copolymer of styrene and 20% divinyl-benzene, apparent density of the above chloride type resin being 0.280 gram dry resin per cc of wet resin. An eluant of the mixed solution of 0.12 M ammonium ethylenediamine tetra-acetate and 0.2 M ammonium chloride adjusted to pH 5.5 with hydrochloric acid and aqueous ammonium solution, was supplied continuously to the top of the column at a flow rate of 4 liters/hour at a temperature of 60°C. After 6 hours eluant supply to the column was interrupted, and was switched to an acidic solution containing 0.12 M ammonium ethylene-diaminetetraacetate, 0.2 M ammonium chloride and 0.012 M of U(IV) chloride, having a $235_U/238_U$ isotope ratio of 0.007253. 4 liters of the mixed solution of U(IV) chloride, EDTA and ammonium chloride were supplied to the column at a flow rate of 4 liters/hour, and then eluant solution flow was resumed at the same flow rate. By repeating these operations, alternating bands of U(IV) EDTA complex ion and eluant ion were formed in the anion exchange resin column, and all bands migrated in parallel in the direction of the flow of eluant. At the steady state, eight pairs of said bands were formed in the anion exchange column of 8 m length, and the width of each U(IV) complex ion band at the outlet of the column was about 74 cm while that of eluant ion band was 20 cm. The time required for each band to travel from the top to the bottom of the column was about 57 hours. The effluent of U(IV) complex ion band was collected at the bottom of the column separately as several fractions. The first 5.5 liters of effluent were collected as a first fraction when each U(IV) complex band reached the bottom of the column, the next 10 liters as a second fraction, and further 5.5 liters as a third fraction. U(IV) compound ion concentration and $^{235}U/^{238}U$ isotope ratios were analyzed in each fraction, a mass-spectroscope being used for isotope ratio determination.

The concentration of U(IV) compound ion $^{235}U/^{238}U$ isotope ratios of said three fractions were, respectively, $0.8 \times 10^{-3}$M and $^{235}U/^{238}U = 0.007382$, $3.8 \times 10^{-3}$ M and $235_U/238_U = 0.007248$ (nearly equal to the feed solution), and $0.6 \times 10^{-3}$ M and $235_U/238_U = 0.007120$. Thus uranium 235 was concentrated by about 1.8% in the frontal part of the effluent of each U(IV) complex ion band.

EXAMPLE 17

A column of 10 cm inner diameter and 12 meter length steel pipe lined with fluorocarbon polymer was filled with a hydrogen type cation exchange resin prepared by sulfonation of a copolymer of styrene and 16% divinylbenzene, apparent density of the above resin in sodium form being 0.400 gram dry resin per cc of wet resin. An eluant of 0.18 M sulfuric acid was supplied continuously to the top of the column at a flow rate of 2.4 liters/hour. After 8 hours eluant supply to the column was interrupted, and was switched to a solution of 0.18 M sulfuric acid and 0.10 M of U(IV) chloride, having a $235_U/238_U$ isotope ratio of 0.007253. 9.6 liters of the mixed solution of U(IV) chloride and sulfuric acid were supplied to the column at a flow rate of 2.4 liters/hour at a temperature of 35°C and then eluant flow was resumed at the same flow rate. By repeating these operations, alternating bands of U(IV) sulfate complex ion and eluant ion were formed in the cation exchange resin column, and all bands advanced in parallel in the direction of the flow eluant. At the steady state, seven pairs of said bands were formed in the cation exchange column of 12 m length, and the width of each U(IV) complex ion band at the outlet of the column was about 123 cm while that of each eluant ion band was about 48 cm. The time required for each band to travel from the top to the bottom of the column was about 100 hours. The effluent of U(IV) complex ion band was collected at the bottom of the column separately as several fractions. The first 6.6 liters of effluent were collected as a first fraction when each U(IV) complex ion band reached the bottom of the column, the next 11.5 liters as a second fraction, and further 6.6 liters as a third fraction. U(IV) compound ion concentration $235_U/238_U$ isotope ratios were analyzed in each fraction, a mass-spectroscope being used for isotope ratio determination.

The concentration of U(IV) compound ion and $235_U/238_U$ isotope ratios of said three fractions were, respectively, $1.1 \times 10^{-3}$M and $235_U/238_U = 0.007110$, $7.4 \times 10^{-3}$M and $235_U/238_U = 0.007253$ (nearly equal to the feed solution), and $1.1 \times 10^{-3}$ M and $235_U/238_U = 0.007397$. Thus uranium 235 was concentrated by about 1.9% in the rear part of the effluent of each U(IV) complex ion band.

EXAMPLE 18

A column of 10 cm inner diameter and 8 meter length steel pipe lined with fluorocarbon polymer was filled with a sodium type cation exchange resin prepared by sulfonating the surface of the copolymer of styrene and 20% divinylbenzene, apparent density of the above sodium type resin being 0.340 gram dry resin per cc of wet resin. An eluant of a mixture of 0.15 M sodium sulfate, 0.20 M sodium chloride and 0.28 M hydrochloric acid was supplied continuously to the top of the column at a flow rate of 2.0 liters/hour at a temperature of 40°C. After 5.5 hour eluant supply to the column was interrupted, and was switched to a solution of 0.20 M sodium chloride, 0.28 M hydrochloric acid and 0.01 M of U(IV) chloride, having a $235_U/238_U$ isotope ratio of 0.007253. 6 liters of above mixed solution of U(IV) chloride were supplied to the column at a flow rate of 2.0 liters/hour, and then eluant flow was resumed at the same flow rate. By repeating these operations alternating bands of U(IV) sulfate complex ion and eluant ion were formed in the cation exchange resin column, and all bands advanced in parallel in the direction of eluant. At the steady state, seven pairs of said bands were formed in the cation-exchange column of 8 m length, and the width of each U(IV) complex ion band at the outlet of the column was about 94 cm while that of each eluant ion band was 15 cm. The time required for each band to travel from the top to the bottom of the column was about 63 hours. The effluent of U(IV) complex ion band was collected at the bottom of the column separately as several fractions. The first 3.8 liters of effluent were collected as a first fraction when each U(IV) complex ion band reached the bottom of the column, the next 6.5 liters as a second fraction, and further 4.2 liters as a third fraction. U(IV) compound ion concentration and $235_U/238_U$ isotope ratios were analyzed in each fraction, a mass-spectroscope being used for isotope ratio determination.

The concentration of U(IV) compound ion and $235_U/238_U$ isotope ratios of said three fractions were respectively, $1.3 \times 10^{-3}$M and $235_U/238_U = 0.007047$, $7.1 \times 10^{-3}$M and $235_U/238_U = 0.007250$ (nearly equal to the feed solution), and $1.1 \times 10^{-3}$M and $235_U/238_U = 0.007455$. Thus the uranium 235 was concentrated by about 2.8% in the rear part of the effluent of each U(IV) complex ion band.

EXAMPLE 19

An eluant of 0.20 M sodium sulfate and 0.28 M hydrochloric acid was supplied continuously to the top of the same cation exchange column as described in Example 17 at a flow rate of 3.0 liters/hour. After 5.0 hours eluant supply to the column was interrupted, and was switched to a solution of 0.2 M sodium sulfate, 0.28 M hydrochloric acid and 0.01 M of U(IV) chloride, having a $235_U/238_U$ isotope ratio of 0.007253. 9 liters of the mixed solution of U(IV) chloride and sodium sulfate was supplied to the column at a flow rate of 3.0 liters/hour at a temperature of 30°C, and then eluant flow was resumed at the same rate. By repeating these operations, alternating bands of U(IV) sulfate complex ion and eluant ion were formed in the cation exchange resin column, and all bands advanced in parallel in the direction of the flow of eluant. At the steady state, seven pairs of the above bands were formed in the cation exchange column of 10 m length, and the width of each U(IV) complex ion band at the outlet of the column was about 133 cm while that of each eluant ion band was 37 cm. The time required for each band to travel from the top to the bottom of the column was about 65 hours. The effluent of U(IV) complex ion band was collected at the bottom of the column separately as several fractions. The first 5.75 liters of effluent were collected as a first fraction when each U(IV) complex band reached the bottom of the column, the next 10 liters as a second fraction, and further 5.75 liters as a third fraction. U(IV) compound ion concentration $235_U/238_U$ isotope ratios were analyzed in each fraction, a mass-spectroscope being used for isotope ratio determination.

The concentration of U(IV) compound ion and $235_U/238_U$ isotope ratios of said three fractions were, respectively, $1.3 \times 10^{-3}$ M and $235_U/238_U = 0.007035$, $7.4 \times 10^{-3}$ M and $235_U/238_U = 0.007250$ (nearly equal to the feed solution), and $1.4 \times 10^{-3}$M and $235_U/238_U = 0.007463$. Thus uranium 235 was concentrated by about 2.4% in the rear part of the effluent of each U(IV) complex ion band.

EXAMPLE 20

A column of 10 cm inner diameter and 12 meter length steel pipe lined with fluorocarbon polymer was filled with a chloride type anion exchange resin prepared by chloromethylation and amination with trimethylamine of copolymer of styrene and 12% divinylbenzene, apparent density of above chloride type resin being 0.355 gram dry resin per cc of wet resin. An eluant of 8.0 M hydrochloric acid was supplied continuously to the top of the column at a flow rate of 4.4 liters/hour at a temperature of 50°C. After 12 hours eluant supply to the column was interrupted and was switched to a solution of 8 M hydrochloric acid and 0.01 M U(IV) chloride, having a $235_U/238_U$ isotope ratio of 0.007253. 8 liters of the mixed solution of U(IV) chloride and hydrochloric acid were supplied to the column at a flow rate of 4.4 liters/hour, and then eluant solution flow was resumed at the same flow rate. By repeating these operations, alternating bands of U(IV) sulfate complex ion and chloride ion were formed in the anion exchange resin column, and all bands advanced in parallel in the direction of flow of eluant. At the steady state, 17 pairs of said bands were formed in the anion exchange column of 12 m length, and the width of each U(IV) complex ion band at the outlet of the column was about 63 cm while that of each chloride ion band was about 8 cm. The time required for each band to travel from the top to the bottom of the column was about 235 hours.

The effluent of U(IV) complex ion band was collected at the bottom of the column separately as several fractions. First 13 liters of effluent were collected as a first fraction when each U(IV) complex ion band reached the bottom of the column, the next 23 liters as a second fraction, and further 13 liters as a third fraction. U(IV) compound ion concentration and $235_U/238_U$ isotope ratios were analyzed in each fraction, a mass-spectroscope being used for isotope ratio determination.

The concentration of U(IV) compound ion and $235_U/238_U$ isotope ratios of said three fractions were, respectively, $0.53 \times 10^{-3}$M and $235_U/238_U = 0.006676$, $2.7 \times 10^{-3}$M and $235_U/238_U = 0.007250$ (nearly equal to the feed solution), and $0.50 \times 10^{-3}$M and $235_U/238_U = 0.007820$. Thus uranium 235 was concentrated by about 7.8% in the rear part of the effluent of each U(IV) complex ion band.

It will be appreciated that the instant specification and examples are set forth by way of illustration and not limitation and that various modifications and changes may be made without departing from the scope and spirit of the present invention.

We claim:

1. Method of simultaneously obtaining separate enriched fractions of $^{235}$U and $^{238}$U from isotopic mixtures thereof, which comprises establishing a liquid body containing a mixture in which the uranium is in the form of U(IV) coordination complexes with a ligand, said complexes being present in a plurality of different valent states, alternately passing through a highly cross-linked porous ion exchange resin said body and then an eluant but not a regenerant, thereby forming a plurality of spaced apart isotope-containing bands each about 2 to 1000 cm in width, and as each isotope-containing band leaves the resin collecting it in at least three fractions, the intermediate fraction having approximately the isotope composition of the starting liquid body, and one of the first and last fractions being selectively enriched in $^{235}$U and the other being selectively enriched in $^{238}$U.

2. The method according to claim 1, wherein the eluant comprises a solution of a mineral acid, an organic acid, a salt or an electrolyte.

3. The method according to claim 1, wherein a plurality of successive ion exchange bodies are provided, the U(IV)-containing bands of effluent from each column being divided into fractions, one of which is enriched with respect to uranium 235 and is advanced to a subsequent ion exchange body, at least one other of said fractions being recycled as feed to an ion exchange body whose feed has substantially the same uranium 235:uranium 238 isotope ratio.

4. The method according to claim 1, wherein said ion exchange body is enclosed by a high polymer film having the same charge as the ion exchange group of the resin.

5. The method of claim 1, wherein said eluant includes ions of U(VI).

6. The method of claim 1, wherein the resin comprises a copolymer of a monoolefin and a diolefin, the diolefin constituting about 5 to 50% of the copolymer, said copolymer having been aftertreated to provide ion exchange groups thereon.

7. Method according to claim 1, in which said ion exchange resin is one of an anion and cation exchange resin and in which the uranium of said U(IV) compound is predominantly present in the liquid body in the form of the other of said anion and cation.

8. Method according to claim 7, in which said ion exchange resin is an anion exchange resin and in which said U(IV) compound is predominantly present in the external liquid body in the form of a cation.

9. Method according to claim 1, in which the U(IV) coordination complex is adsorbed in the ion exchange resin in a form having a higher average valence state than its average valence state in the liquid body.

10. Method according to claim 1, in which said U(IV) coordination complexes are formed in situ with ligands obtained from at least one of said eluant and ion exchange resin.

11. Method according to claim 10, in which said ion exchange resin is a ligand-type ion exchange resin and in which said eluant is an electrolyte solution formed from an electrolyte different from said ligand compound.

12. Method according to claim 1, in which said ion exchange resin is an anion exchange resin and in which said U(IV) coordination complex is in the form of a cation present in the liquid body with a low ligand concentration.

13. Method according to claim 1, in which said liquid body is passed through an ion exchange column in the form of a band and in which said separate spaced apart areas in the body enriched in $^{235}$U and $^{238}$U, respectively, constitute an area in the frontal part of the band enriched in $^{235}$U and an area in the rear part of the band enriched in $^{238}$U when said ion exchange resin is an anion exchange resin, and viceversa when said ion exchange resin is a cation exchange resin.

14. Method according to claim 1, in which said eluant is passed through said resin at a substantially higher flow velocity than the flow velocity of the bands of uranium coordination compound.

15. Method according to claim 1, in which said eluant is a compound having ligand and sulfonic acid radicals or quaternary ammonium groups.

16. Method according to claim 1, wherein the uranium of said coordination complex is present in only one valent state, the ligand providing for the plurality of different valent states of said complexes.

* * * * *